United States Patent [19]

Davis

[11] 4,136,670
[45] Jan. 30, 1979

[54] SOLAR HEATING COLLECTOR APPARATUS

[76] Inventor: Theodore L. Davis, 21 Meryl St., Medway, Mass. 02053

[21] Appl. No.: 805,688

[22] Filed: Jun. 13, 1977

[51] Int. Cl.² ............................................. F24J 3/02
[52] U.S. Cl. .................................... 126/271; 126/270
[58] Field of Search ................ 126/270, 271; 237/1 A

[56] References Cited

U.S. PATENT DOCUMENTS

| 3,125,091 | 3/1964 | Sleeper, Jr. | 126/271 |
| 4,057,048 | 11/1977 | Maine | 126/271 |

Primary Examiner—Kenneth W. Sprague
Attorney, Agent, or Firm—John E. Toupal

[57] ABSTRACT

A solar heating system including an energy absorbent collector dish for receiving solar heat, a supply tube for distributing a heat transfer fluid over the collector dish, a drain pipe for removing the heat transfer liquid from the collector dish and an optical director including an array of converging lenses oriented to receive radiant energy from the sun and to direct the energy onto the collector dish. The array of converging lenses comprises a matrix of double convex lenses that form one half of a hemispherical optical dome, the other half of which possesses an inner reflective surface for reflecting radiant energy onto the collector dish and the optical dome is oriented such that some portion of the lens array faces the sun during an entire day's movement.

7 Claims, 2 Drawing Figures

SOLAR HEATING COLLECTOR APPARATUS

BACKGROUND OF THE INVENTION

This invention relates generally to heating systems and, more particularly, to collector apparatus for solar powered heating systems.

Most modern heating systems rely on petroleum products as a primary source of energy. However, because of the ever-increasing interest in reducing the levels of air pollution and retarding the depletion of diminishing petroleum resources, alternate forms of heating energy are being sought more enthusiastically. Such alternate energy sources include, for example, solar energy, nuclear energy, wind energy, tidal energy, etc. Because of the complexity and inefficiency of the energy conversion system that they require, most of alternate energy sources such as the wind and the tides are generally considered impractical with the present state of technology. Nuclear energy, although viable in many respects, presents the extreme hazards that are inherent to the operation of nuclear reactors. At the present time, therefore, the major thrust toward the development of alternate energy sources is concentrated in the area of solar energy. Known solar heating systems, however, are generally inefficient and costly primarily because of requirements for either relatively large planar heat collection surfaces or rather complex moving collectors that track the sun. In addition, the large and bulky collectors conventionally used are generally unattractive and subject to damage by environmental factors such as wind and snow.

The object of this invention, therefore, is to provide an improved radiant energy collector apparatus for use in solar heating systems.

SUMMARY OF THE INVENTION

The present invention is a solar heating system including an energy absorbent collector dish for receiving solar heat, a supply tube for distributing a heat transfer fluid over the collector dish, a drain pipe for removing the heat transfer liquid from the collector dish and an optical director including an array of converging lenses oriented to receive radiant energy from the sun and to direct the energy onto the collector dish. Preferably, the array of converging lenses comprises a matrix of double convex lenses that form one half of a hemispherical optical dome the other half of which possesses an inner reflective surface for reflecting radiant energy onto the collector dish. The optical dome is oriented such that some portion of the lens array faces the sun during an entire day's movement.

In a preferred embodiment of the invention, the optical dome is covered by and spaced from a light transmissive, hemispherical insulator dome that establishes a heat insulation space between the environment and a collection volume defined by the optical dome and the collector dish. The insulative space reduces the heat loss from the collection volume thereby enhancing the efficiency of the system. A further enhancement of efficiency is established by the provision of a sprinkler pipe located in the collection volume and disposed so as to direct a spray of heat transfer liquid onto the collector dish.

Another feature of the invention is a pressure relief valve disposed between the insulator and optical domes and providing a fluid communication path between the collection volume and the environment surrounding the insulator dome. The pressure relief valve automatically opens in response to an excessive pressure in the collection volume thereby preventing possible damage to the optical dome that could be caused by the forces resulting from excessive pressure.

DESCRIPTION OF THE DRAWINGS

These and other features and objects of the present invention will become more apparent upon a perusal of the following description taken in conjunction with the accompanying figures wherein.

DESCRIPTION OF THE PREFERRED EMBODIMENT

Figure 1:
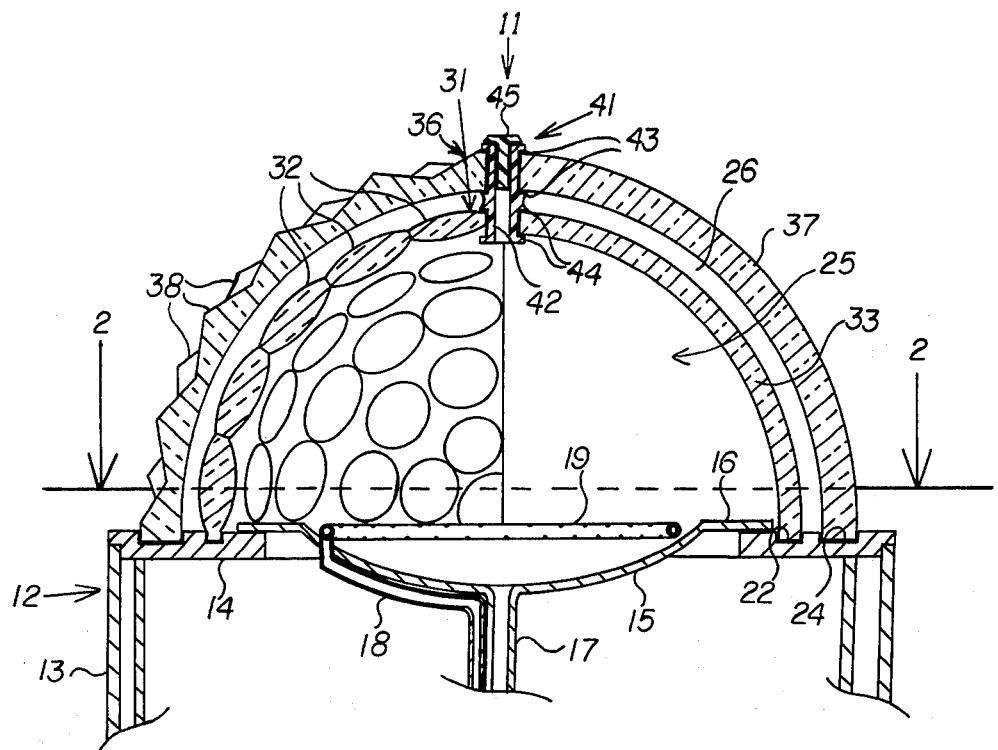
FIG. 1 is a schematic cross-sectional view of a solar heat collector apparatus according to the present invention.
Figure 2:
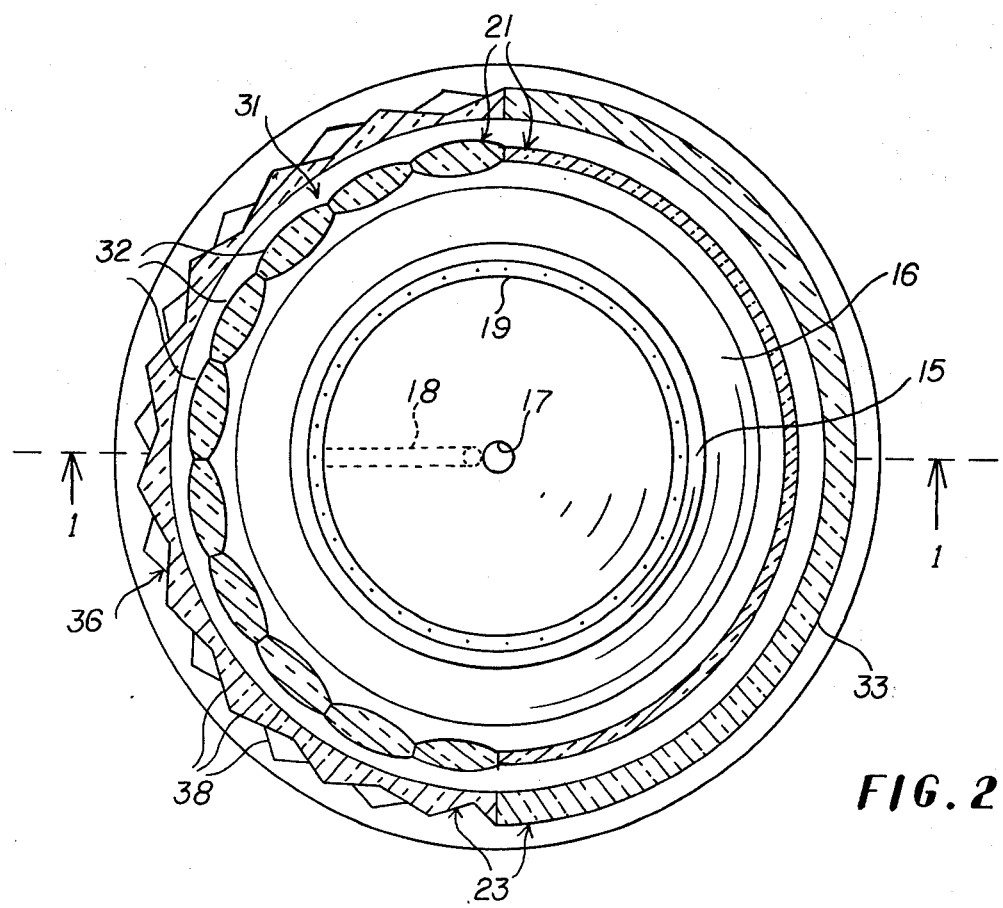
FIG. 2 is a schematic cross-sectional view taken along lines 2—2 of FIG. 1.

As shown in FIGS. 1 and 2, the invention comprises a solar energy collector structure 11 mounted on a supporting base 12. Forming the base 12 is an insulated, double-wall housing 13 and an annular cover 14 that accommodates the collector structure 11. The housing 13 would be mounted on any suitable supporting structure (not shown) such as a dwelling or a commercial building.

The collector structure 11 includes a horizontally oriented, convex collector dish 15 having a peripheral lip 16 that is supported by the annular cover 14. Extending out of a central portion of the collector dish 15 is a drain pipe 17 while a supply pipe 18 extends through an opening in the dish directly adjacent to the peripheral lip 16. A circular sprinkler tube 19 is connected for fluid communication with the supply pipe 18 and extends around the dish 15 in close proximity to the lip portion 16.

Also part of the collector structure 11 are a hemispherical optical dome 21 that is received by an annular channel 22 in the cover 14 and a hemispherical, light transmissive insulator dome 23 that is received by an annular channel 24 in the cover 14. The optical dome 21 covers the collector dish 15 so as to define therewith a collector volume 25 while the insulator dome 23 overlays the optical dome 21 and is spaced therefrom so as to define therewith an insulator space 26. One half of the optical dome 21 comprises an optical director portion 31 formed by a matrix array of converging lenses 32. Each of the lenses 32 is a double convex lens that focuses light toward the collector dish 15. The other half 33 of the optical dome 21 possesses a light reflective inner surface 34 that reflects radiant energy back toward the collector dish 15.

The insulator dome 23 also is formed by discrete halves including a first portion 36 that overlays the optical director half 31 of the optical dome 21 and a second portion 37 that covers the other half 33 of the optical dome 21. Forming the first portion 36 is an array of optical elements 38 having irregularly oriented surfaces. The elements 38 function to reduce reflection of the sun's parallel rays which are transmitted toward the optical director 31.

A pressure relief valve 41 extends through central openings in the optical dome 21 and the insulator dome 23. Forming the relief valve 41 is a hollow sleeve 42 having outwardly directed, spaced apart upper flanges 43 that accommodate the insulator dome 23 and lower flanges 44 that accommodate the optical dome 21. Press fitted into the sleeve 42 is a stopper 45 that is removable by excessive pressure.

The housing 13 is preferably oriented on a suitable support structure (not shown) such that portions of the optical director half 31 of the optical dome 21 will face the sun during a full day's excursion across the sky. Radiant energy from the sun passes through the first portion 36 of the insulator dome 23 and is focused by the lenses 32 of the optical director 31 onto the collector dish 15 which is preferably formed or coated with a highly light-absorbent material. Any light reflected from the collector dish 15 onto the inner surface 34 of the optical dome half 33 is redirected into the collector volume 25. A suitable heat transfer liquid, for example water, preferably colored so as to be heat absorbent, is pumped through the supply tube 18 by a suitable pumping system (not shown). The heat transfer liquid received from the supply tube 18 is discharged by the sprinkler tube 19 onto the surface of the collector dish. After acquiring heat from the solar heated dish 15, the heat transfer liquid egresses through the drain pipe 17 and is collected in a suitable storage reservoir (not shown) that is used as a source of heat.

Because of the focusing effect of the optical director 31, the collector apparatus 11 functions as an efficient solar heat collector without any requirement for extensive planar surfaces or complicated mechanical solar tracking systems. Furthermore, the efficiency of the system is enhanced by the heat insulative space 26 provided by the insulator dome 23 and the heat transfer sprinkler system provided by the sprinkler tube 19. In the event that the pressure within the collector volume 25 exceeds predetermined limits, the stopper 45 is forced out of the sleeve 42 so as to vent the volume 25 to the environment surrounding the unit 11. Thus, the pressure relief valve 41 functions to prevent damage of the unit 11 that might be caused by forces generated by excessive pressure within the collector volume 25.

Obviously, many modifications and variations of the present invention are possible in light of the above teachings. It is to be understood, therefore, that the invention can be practiced otherwise than as specifically described.

What is claimed is:
1. A solar heating system comprising:
   a collector dish for receiving solar heat;
   supply means for distributing a heat transfer liquid over said collector dish;
   drain means for removing the heat transfer liquid from said collector dish; and
   optical director means for directing solar energy onto said collector dish, said director means comprising an array of converging lenses oriented to receive radiant energy from the sun and to direct said energy onto said collector dish, said array of converging lenses comprising a substantially hemispherical optical dome one portion of which is formed by a matrix of double convex lenses oriented so as to have portions facing the sun during substantially an entire day and another portion of which comprises an inner surface that is reflective of radiant energy so as to reflect solar energy toward said collector dish.

2. A system according to claim 1 wherein said collector dish is a substantially horizontally oriented convex dish formed of a highly radiant energy absorbent material, and said drain means comprises a drain pipe opening into a central portion of said dish.

3. A system according to claim 2 wherein said supply means comprises a sprinkler tube mounted over said dish so as to direct thereon a spray of said heat transfer liquid.

4. A system according to claim 3 including a substantially hemispherical light transmissive insulator dome overlying and spaced from said optical dome, the space between said optical and insulator domes forming an insulation barrier for the volume between said dish and said optical dome.

5. A system according to claim 4 wherein said insulator dome comprises a portion overlying said one half of said optical dome and formed by irregularly oriented light transmissive sections that direct solar energy toward said one half of said optical dome.

6. A system according to claim 5 including pressure relief means for automatically venting said volume in response to an increase of fluid pressure therein above a predetermined level.

7. A system according to claim 6 wherein said pressure relief means comprises a pressure relief valve disposed between said insulator and optical domes and operable to provide fluid communication between said volume and the environment surrounding said insulator dome.

* * * * *